(12) United States Patent
Canis et al.

(10) Patent No.: US 11,224,925 B2
(45) Date of Patent: Jan. 18, 2022

(54) PIPE CUTTER

(71) Applicant: Monument Tools Limited, Wallington (GB)

(72) Inventors: Stephen Canis, Wallington (GB); Jonathan Norton, Wallington (GB); John Arthur Collier, Wallington (GB)

(73) Assignee: Monument Tools Limited, Wallington (GB)

( * ) Notice: Subject to any disclaimer, the term of this patent is extended or adjusted under 35 U.S.C. 154(b) by 0 days.

(21) Appl. No.: 16/862,452

(22) Filed: Apr. 29, 2020

(65) Prior Publication Data
US 2020/0346291 A1 Nov. 5, 2020

(30) Foreign Application Priority Data

Apr. 30, 2019 (GB) ..................................... 1906066
Nov. 29, 2019 (GB) ..................................... 1917514

(51) Int. Cl.
*B23D 45/12* (2006.01)
*B23D 21/06* (2006.01)
*B23D 21/08* (2006.01)

(52) U.S. Cl.
CPC ........... *B23D 45/126* (2013.01); *B23D 21/06* (2013.01); *B23D 21/08* (2013.01)

(58) Field of Classification Search
CPC B23D 45/12–126; B23D 21/06; B23D 21/08; B23D 21/14; B23D 21/145
USPC ................................................. 30/101–102
See application file for complete search history.

(56) References Cited

U.S. PATENT DOCUMENTS

| 2,739,381 | A | * | 3/1956 | Petersen | ................ | B23D 21/08 30/101 |
| 3,335,492 | A | * | 8/1967 | Spiro | ..................... | B23D 21/08 30/101 |
| 4,831,732 | A | * | 5/1989 | Garton | ................... | B23D 21/08 30/101 |
| 5,285,576 | A | * | 2/1994 | Taylor | ................... | B23D 21/08 30/94 |

(Continued)

FOREIGN PATENT DOCUMENTS

| CH | 662082 | 9/1987 |
| CN | 202726171 | 2/2013 |

(Continued)

*Primary Examiner* — Kenneth E Peterson
*Assistant Examiner* — Richard D Crosby Jr
(74) *Attorney, Agent, or Firm* — Wells St. John P.S.

(57) ABSTRACT

Cutting devices and associated methods are described. In one aspect, a cutting device includes an annular support body defining an axial space into which a pipe to be cut can be inserted, the body formed of a rigid material and including a blade-bearing portion and a non-blade-bearing portion, wherein the blade-bearing portion is secured to the non-blade-bearing portion by a hinge mechanism allowing the two portions to be movable between an open position in which a pipe can be inserted, and a closed position in which the pipe is engaged by the body, wherein a part of the blade-bearing portion spaced from the hinge mechanism includes a blade that protrudes radially inwards of the body, such that in use the urging of the two portions towards the closed position urges the pipe against the blade so that rotation of the cutting device around the pipe cuts the pipe.

19 Claims, 12 Drawing Sheets

(56) References Cited

U.S. PATENT DOCUMENTS

| | | | | |
|---|---|---|---|---|
| 5,711,077 | A * | 1/1998 | Schulz | B26B 25/005 30/160 |
| 5,903,980 | A * | 5/1999 | Collier | B23D 21/08 30/101 |
| 6,032,367 | A * | 3/2000 | Bonnette | B23D 21/08 30/101 |
| 6,327,783 | B1 * | 12/2001 | Ming | B26B 25/005 30/286 |
| 6,393,700 | B1 * | 5/2002 | Babb | B23D 21/08 30/101 |
| 6,658,739 | B1 * | 12/2003 | Huang | B23D 21/08 30/101 |
| 6,810,587 | B1 * | 11/2004 | Robertson | B26D 3/169 30/101 |
| D556,528 | S * | 12/2007 | Huang | D8/60 |
| RE40,461 | E * | 8/2008 | Hu | B23D 21/08 30/102 |
| D640,520 | S | 6/2011 | Rampling | |
| 8,196,788 | B1 * | 6/2012 | Demko | B26B 29/00 224/234 |
| 8,555,513 | B2 * | 10/2013 | Moreland | B26B 25/005 30/292 |
| 8,573,099 | B2 * | 11/2013 | Huang | B23D 21/08 82/113 |
| 8,601,697 | B2 * | 12/2013 | Whittaker | B26D 3/169 30/101 |
| 9,278,459 | B2 * | 3/2016 | Block | B26D 1/205 |
| 9,636,760 | B2 | 5/2017 | Shepherd | |
| D824,225 | S * | 7/2018 | Klipshtein | D7/694 |
| 10,052,701 | B2 * | 8/2018 | Zhou | B23D 21/08 |
| 10,138,104 | B2 * | 11/2018 | Bargetto | B67B 7/34 |
| D851,473 | S * | 6/2019 | Hyma | D8/60 |
| 10,688,677 | B2 * | 6/2020 | Xie | B26D 1/1575 |
| 10,919,098 | B2 * | 2/2021 | Hyma | B23D 21/08 |
| 10,940,599 | B2 * | 3/2021 | Reyes | B26B 5/00 |
| 2005/0028388 | A1 * | 2/2005 | Liu | B26B 25/005 30/319 |
| 2005/0086809 | A1 * | 4/2005 | Myers | B23D 21/08 30/101 |
| 2006/0280133 | A1 | 11/2006 | Goop | |
| 2007/0180701 | A1 * | 8/2007 | Hutt | B23D 21/08 30/95 |
| 2009/0065386 | A1 * | 3/2009 | Hasegawa | A47F 7/0028 206/349 |
| 2010/0088898 | A1 * | 4/2010 | Thorson | B23D 21/04 30/95 |
| 2012/0023752 | A1 | 2/2012 | Rampling et al. | |
| 2012/0084985 | A1 | 4/2012 | Whittaker | |
| 2014/0082850 | A1 * | 3/2014 | Stokes | B25F 1/04 7/108 |
| 2014/0255626 | A1 * | 9/2014 | Chang | B26B 29/00 428/34.1 |
| 2016/0114414 | A1 | 4/2016 | Shepherd | |
| 2016/0167239 | A1 * | 6/2016 | Gallegos | B26B 5/003 30/162 |
| 2016/0193741 | A1 * | 7/2016 | Wong | B26B 29/00 30/287 |
| 2019/0174887 | A1 * | 6/2019 | Lee | F41B 15/08 |
| 2021/0008737 | A1 * | 1/2021 | Cauley, Jr. | B25G 1/102 |

FOREIGN PATENT DOCUMENTS

| | | |
|---|---|---|
| CN | 205629510 | 10/2016 |
| DE | 19710568 | 9/1998 |
| EP | 3450070 | 3/2019 |
| EP | 20164641.1 | 10/2020 |
| GB | 2413440 | 10/2005 |
| GB | 2457447 | 8/2009 |
| GB | 2496661 | 5/2013 |
| GB | 1906066.4 | 11/2019 |
| JP | H 11-90725 | 4/1999 |
| JP | 2010-005703 | 1/2010 |
| JP | 6-469924 | 2/2019 |
| TW | I636859 | 10/2018 |

* cited by examiner

PIPE CUTTER

CROSS-REFERENCE TO RELATED APPLICATION

This application claims priority to GB Patent Application No. 1906066.4, which was filed Apr. 30, 2019, and this application also claims priority to GB Patent Application No. 1917514.0, which was filed Nov. 29, 2019, the teachings of which are incorporated herein by reference.

FIELD

The present invention relates to a cutting device for cutting a pipe of a set diameter, in particular for cutting a plastic pipe.

BACKGROUND

Plumbing systems generally use copper or plastic piping, plastic being increasingly preferred due to its lower cost. The pipes are provided in a variety of lengths, which are then cut to the appropriate size for the system.

A known tool for cutting a plastic pipe is described in GB2457447. The tool comprises a body having a bore for receiving a cylindrical conduit, a slot extending from an external surface of the body to the bore and a cutting blade extending into said bore along a plane extending at right angles to an axis through the body. The slot tapers so that its width progressively diminishes with distance from the external surface of the body to the external circumference of the bore. The body is formed by a first segment on one side of the slot, which is generally rigid and inflexible and a hollow second segment on the other side of the slot, which is resilient and flexible. This causes flexing and resilience so that the conduit is urged against the blade, allowing the cutting of the blade.

Effective cutting by the tool requires the application of a substantial amount of force to the body from the user. In addition, the blade of the tool is exposed when not in use; unless a blade cover is also used. This can result in injury to a user.

The present invention seeks to provide an improved cutting device.

DESCRIPTION

The present invention relates to a cutting device for cutting a pipe of a set diameter. The cutting device has an annular support body for engaging a pipe to be cut, the annular support body formed of a rigid material and comprising a blade-bearing portion and a non-blade-bearing portion, the blade-bearing portion being secured to the non-blade-bearing portion by way of a hinge mechanism. The hinge mechanism allows the two portions to be movable between an open position, in which the pipe can be inserted and removed from the body, and a closed position, in which the pipe, once inserted, is engaged by and axially aligned with the annular support body. In the closed position, the blade-bearing portion of the annular support body opposes the non-blade bearing portion, such that in use the urging of the two portions towards the closed position urges the pipe against the blade so that rotation of the cutting device around the pipe cuts the pipe.

According to a first aspect there is provided a cutting device for cutting a pipe of a set diameter, the cutting device comprising an annular support body defining an axial space into which a pipe to be cut can be inserted, the annular support body formed of a rigid material and comprising a blade-bearing portion and a non-blade-bearing portion, the blade-bearing portion being secured to the non-blade bearing portion by a hinge mechanism allowing the two portions to be movable between an open position, in which the pipe can be inserted and removed from the body, and a closed position, in which the pipe, once inserted, is engaged by and axially aligned with the annular support body, wherein a part of the blade-bearing portion spaced from the hinge mechanism comprises a blade that protrudes radially inwards of the annular body, such that in use the urging of the two portions towards the closed position urges the pipe against the blade so that rotation of the cutting device around the pipe cuts the pipe.

The blade of the blade-bearing portion is not located at or fixed to the hinge mechanism, i.e. the blade is fixed to a part of the blade-bearing portion other than the part comprising the hinge mechanism.

The hinge mechanism may comprise or be formed by a cylindrical shaft. Alternatively, the hinge mechanism may comprise two or more pegs configured to be received by two or more hinge recesses. The two or more pegs may be cylindrical. In some embodiments, the non-blade-bearing portion comprises the two or more pegs and the blade-bearing portion comprises the two or more hinge recesses. In some embodiments, the blade-bearing portion comprises the two or more pegs and the non-blade-bearing portion comprises the two or more hinge recesses.

The use of pegs can be advantageous as it provides fewer separate components to the cutting device. This can make manufacture and repair easier, cheaper and more efficient.

It will be appreciated that by "rigid" it is meant that the material offers very little resilience and does not deflect appreciably when forces of the magnitude required to operate the device are applied.

The inventors envisage that the cutting device may be used for cutting plastic pipes.

The location of the blade-bearing portion opposite to the non-blade-bearing portion ensures that the portions can be moved to the closed position to prevent exposure of the blade, and potential injury, when not in use.

As the skilled person will appreciate, annular refers to a ring shape, i.e. a circular band enclosing a space. The annular support body thus comprises a cylindrical outer surface and a cylindrical inner surface between which is defined a circular band. The cylindrical inner surface encloses the axial space such that in use at least a portion of the cylindrical inner surface engages the pipe to be cut. The cylindrical outer surface allows the cutting device to be handled by the user.

It will be understood that the pipe of a set diameter has a diameter, which is capable of fitting into the diameter of the axial space defined by the cylindrical inner surface. However, when the pipe is first inserted into the device it is prevented from fully entering the axial space by the blade, as the blade extends into the space.

In the context of the present invention, the diameter of the annular support body or the axial space enclosed by the annular support body will be understood to refer to the diameter as measured in a direction orthogonal to the engagement axis.

The width of the annular support body will be understood to be the depth of the annular support body as measured in a direction aligned with the longitudinal axis of the annular support body. For the avoidance of doubt, and as used herein, "the longitudinal axis of the annular support body" refers to the axis, which is aligned with the axis of the pipe when in use.

When the annular support body is not engaging a pipe and when the portions are closed, an end of the non-blade-bearing portion distal to the hinge mechanism abuts an end of the blade-bearing portion of the annular support body. This generates a continuous annular body and defines the diameter of the axial space enclosed by the annular support body.

When the annular support body is engaging a pipe and in the closed position, the distal end of the non-blade-bearing portion does not abut the end of the blade-bearing portion of the annular support body, since the pipe is prevented from fully entering the space defined by the cylindrical inner surface by the blade. This prevents the non-blade-bearing portion from closing against the blade-bearing portion of the annular support body. This enables the user to push against either portion, or both portions, with the desired force to urge the pipe against the blade, resulting in cutting of the pipe. Advantageously, this results in fine control of the cutting of the pipe while only requiring the application of limited force to a small portion of the annular support body. This improves ease of use.

It will be appreciated that when a pipe is engaged by the annular support body and the portions are in the closed position, although the non-blade-bearing portion does not abut the end of the blade-bearing portion of the annular support body, the portions are closed sufficiently to secure the pipe by the annular support body, i.e. the portions act as gates to prevent the pipe from falling out of the annular support body. The accidental removal of the pipe is thereby avoided.

It will be understood that the cylindrical inner surface of the annular support body may be considered as comprising a part-cylindrical inner surface of the non-blade-bearing portion and a part-cylindrical inner surface of the blade-bearing portion. It is further understood that any reference herein to the cylindrical inner surface of the blade-bearing portion or the non-blade-bearing portion refers to the part-cylindrical inner surface of that portion. In this way, the terms part-cylindrical inner surface and cylindrical inner surface may be used interchangeably when in reference to the blade-bearing and non-blade-bearing portions.

In some embodiments, the part-cylindrical inner surface of the blade-bearing portion may have a radius which differs from a radius of the part-cylindrical inner surface of the non-blade-bearing portion. In such embodiments, the cylindrical inner surface of the annular support body may still be considered substantially cylindrical.

In some embodiments, the radius of the cylindrical inner surface of the blade-bearing portion is less than or equal to the radius of the pipe to be cut, i.e. an interference fit. The radius of the cylindrical inner surface of the non-blade-bearing portion may be the same as the radius of the pipe to be cut. In other words, the cylindrical inner surface of the blade-bearing portion may have a tight fit around the pipe, as compared to the fit around the pipe of the cylindrical inner surface of the non-blade-bearing portion.

In some embodiments, the blade-bearing portion of the annular support body comprises a part-cylindrical inner surface and the non-blade-bearing portion of the annular support body comprises a part-cylindrical inner surface. A radius of the part-cylindrical inner surface of the blade-bearing portion may be less than or equal to a radius of the pipe to be cut. A radius of the part-cylindrical inner surface of the non-blade-bearing portion may be less than or equal to the radius of the pipe to be cut. The radius of the part-cylindrical inner surface of the blade-bearing portion and the radius of the part-cylindrical inner surface of the non-blade-bearing portion may both be less than or equal to the radius of the pipe to be cut.

In other words, the part-cylindrical inner surface of the blade-bearing portion and/or the part-cylindrical inner surface of the non-blade-bearing portion may provide an interference fit. In other words, the part-cylindrical inner surface of the blade-bearing portion and/or the part-cylindrical inner surface of the non-blade-bearing portion may have a tight fit around the pipe This interference fit is advantageous as it ensures the pipe is gripped firmly in operation, thereby preventing the pipe from moving laterally during use. Such lateral movement would hinder the ability of the device to provide a square and uniform cut. In addition, the interference fit pulls or pushes the tube into the blade-bearing portion without crushing or deforming the tube. This improves the ease of use and ensures a clean-cut, without unnecessarily damaging the tube.

In some embodiments, the radius of the cylindrical inner surface of the blade-bearing portion and/or the non-blade-bearing portion is greater than the radius of the pipe to be cut, i.e. a clearance fit. In other words, the cylindrical inner surface of the blade-bearing portion and/or the non-blade-bearing portion may have a loose fit around the pipe. It will be appreciated that although the cutting device is sized to fit a particular size of pipe, when a smaller diameter pipe is inserted the device may still work effectively. In other words, while the cutting device is made specifically for a certain pipe size, many similar but smaller pipes can also be cut.

In some embodiments, the blade-bearing portion and the non-blade bearing portion are both substantially semi-annular. In some embodiments, the blade-bearing portion forms a larger proportion of the annulus than the non-blade-bearing portion. In some embodiments, the blade-bearing portion forms a smaller proportion of the annulus than the non-blade-bearing portion.

For the avoidance of doubt and as used herein, "semi-annular" refers to half of the annulus when the annulus is divided along its diameter.

The annular support body is formed of a rigid material. Many rigid materials are tough and long lasting. Such materials ensure that the cutting device is durable. In addition, the rigid nature of the annular support body ensures a desired force can be exerted against the portions to urge the pipe against the blade, improving the cutting of the pipe.

Rigid materials are also readily accessible and easy to mould into the desired shape, for example by methods such as 3D printing. A suitable rigid material may include, but not be limited to, plastics. In some embodiments the annular support body comprises plastic, preferably a thermoplastic. Suitable plastics include, but are not limited to, polypropylene, polyoxymethylene (also known as Acetal), nylon, ABS (acrylonitrile butadiene styrene), or PET (polyethylene terephthalate) plastic. The plastic may comprise a glass-filled plastic, for example glass-filled nylon.

In some embodiments at least a portion of the cylindrical outer surface of the annular support body is ridged, i.e. comprises a plurality of ridges. The plurality of ridges may be aligned with the longitudinal axis of the annular support body. In some embodiments the cylindrical outer surface is ridged. Ridges improve the grip of the user. This improves handling of the device, and thus cutting and safety.

In some embodiments the diameter of the annular support body is greater than the width of the annular support body. This provides an ergonomic design, which is easy to handle or grip.

In some embodiments the blade comprises a linear cutting edge. The blade may comprise or consist of metal, for example steel. Suitable types of steel include, but are not limited to carbon steel, stainless steel, tool steel and high-speed steel.

In some embodiments, the linear cutting edge of the blade has one or both ends encased in the material of the blade-bearing portion of the annular support body, i.e. the linear cutting edge forms at least a partial geometric chord across the space enclosed by the cylindrical inner surface.

In some embodiments, the linear cutting edge of the blade has both ends encased in the material of the blade-bearing portion of the annular support body. In other words, the linear cutting edge forms a geometric chord across the space enclosed by the cylindrical inner surface.

In some embodiments, the linear cutting edge of the blade has only one end encased in the material of the blade-bearing portion of the annular support body. In other words, the linear cutting edge forms only a partial geometric chord across the space enclosed by the cylindrical inner surface. The linear cutting edge may form, for example, at least a half, a third, a quarter, a fifth or a different fraction of a geometric chord across the space enclosed by the cylindrical inner surface. The linear cutting edge may form no more than a half, a third, a quarter, a fifth or a different fraction of a geometric chord across the space enclosed by the cylindrical inner surface.

In embodiments in which the linear cutting edge forms only a partial geometric chord, it is understood that the blade is truncated such that it forms a triangular protrusion, from the cylindrical inner surface, with an exposed point or sharp corner. This configuration makes it easier for the blade to pierce a pipe in order to initiate cutting. This means that less force is required to close the portions of the cutting device. It also enables the blade to cut the pipe squarely, which is particularly useful when cutting pipes which are for use in push-fit arrangements, which are well known in the industry.

As used herein, "exposed point" will be understood to refer to the point of the triangular protrusion, which is not encased in the material of the blade-bearing portion, i.e. it is exposed to the axial space enclosed by the cylindrical inner surface.

The exposed point may have an inner angle of no more than 90°, no more than 80°, no more than 60°, no more than 50° or no more than 45°. In some embodiments the exposed point has an angle of 90°.

In some embodiments in which the blade forms a triangular protrusion (i.e. the linear cutting edge forms a partial geometric chord), the exposed point of the triangular protrusion may be offset with respect to the diameter of the annular support body which bisects the blade-bearing portion. In other words, the blade is angled such that the diameter that bisects the blade-bearing portion does not pass through the corner of the triangular protrusion. Such an offset means that the exposed point is optimally placed to pierce the pipe when the portions are urged towards the closed position.

In some embodiments in which the blade forms a triangular protrusion (i.e. the linear cutting edge forms a partial geometric chord), the exposed point of the triangular protrusion may be aligned with the diameter of the annular support body which bisects the blade-bearing portion. In other words, the blade is angled such that the diameter, which bisects the blade-bearing portion, passes through the corner of the triangular protrusion. Optionally, the blade may be angled such that the diameter that bisects the blade-bearing portion also bisects the inner angle of the exposed point.

In some embodiments, the linear cutting edge of the blade has neither end encased in the material of the blade-bearing portion of the annular support body. In other words, the blade forms a rectangular protrusion from the cylindrical inner surface.

The blade-bearing portion of the annular support body may comprise two pieces, optionally mirror-image pieces, coupled to one another at an interface generally perpendicular to the longitudinal axis. In some embodiments the blade is fixed by being clamped between the two pieces at the interface. The blade may be offset from one of the pieces relative to the other.

Either portion of the annular support body may comprise at least one external recess having a depth aligned with the longitudinal axis of the annular support body. In some embodiments the blade-bearing portion and/or the non-blade bearing portion of the annular support body comprises two opposing recesses, each recess having a depth aligned with the longitudinal axis of the annular support body. It will be appreciated that the support body portion has a wall separating the two opposing recesses. In some embodiments, both portions have the aforementioned recesses.

In some embodiments, the recess is or the recesses are enclosed, such that the portion forms an at least partially hollow structure. Hence, the portion(s) may be at least partially hollow with a closed sidewall. The use of a closed sidewall increases the strength of the non-blade-bearing portion and provides a device, which is simple to manufacture.

In some embodiments, the recess has or the recesses have a depth, which is substantially half the width of the annular support body.

In some embodiments, the recess has or the recesses have a depth, which is substantially narrower than the width of the annular support body. The depth of the recess or each recess may be at least 5, 10, 15, 20, 25, 30 or 45% of the width of the annular support body. The depth of the recess or each recess may be no more than 45, 40, 35, 30, 25, 20, 15, 10 or 5% of the width of the annular support body.

The non-blade-bearing portion of the annular support body may be unitary. This provides a device, which is simple to manufacture.

In some embodiments, the non-blade-bearing portion comprises a blade alignment indicator. The blade alignment indicator may provide an indication of the position of the blade. The blade alignment indicator may provide an indication of the position of the blade with respect to the width of the annular support body. The blade alignment indicator may be a visible mark or line which is aligned with the blade with respect to the width of the annular support body. The blade alignment indicator may be a visible line which runs parallel with the linear cutting edge of the blade. The blade alignment indicator may be embossed, engraved, painted, or otherwise applied to the non-blade-bearing portion.

The blade alignment indicator is advantageous to the user of the cutting device since it provides a means of easily aligning the cutting device to cut the tube at a desired position. It can be readily understood that, with a tube in place prior to cutting, it would be difficult for the user to identify the location of the blade. This could lead to uncertainty as to where the final cut would take place on the tube. In other words, the user may be unsure of the angle of the cut, or the position relative to the length of the tube. With the presence of a blade alignment indicator, the user is clear on where the blade is located and at what position the cut will be made with respect to the pipe.

In some embodiments, the device further comprises a removable guard for engagement with the annular support body when the cutting device is not in use. When engaged with the annular support body, the removable guard is aligned with the longitudinal axis of the annular support body. The guard engages with the cylindrical inner surface of the annular support body and the blade to cover and guard the blade. This prevents objects, for example fingers, from engaging with the blade and so reduces the risk of injury.

The guard may be cylindrical. In other embodiments the guard has an hourglass shape, the narrowest section of the hourglass aligning with the blade when engaged with the annular support body.

The removable guard may have a diameter equal to the diameter of the axial space enclosed by the annular support body. The removable guard may comprise or consist of a resilient material, for example a resilient plastic.

In some embodiments the guard comprises a groove, which aligns with the blade when engaged with the annular support body.

The guard may comprise a cap at both ends, the cap having a diameter greater than the diameter of the axial space enclosed by the annular support body. This secures the guard in the cutting device when in the closed position.

In some embodiments, each of the caps comprises a shelf. The shelf may extend longitudinally from the cap. The shelf may extend longitudinally inwards from the cap. The shelf may be circular. The shelf may have a radius smaller than the caps.

The shelf is advantageous as it ensures that the guard establishes an interference fit with the cutting device. This prevents unwanted lateral movement by the guard, which in turn prevents the guard from being inadvertently lost from the cutting device. In addition, the interference fit provided by the shelf assists in the retention of the guard while the two portions of the cutting device are in the open configuration. This prevents the guard from falling out of the cutting device while the two portions of the cutting device are opened.

In some embodiments, the radius of the shelf may be chosen such that the guard establishes an interference fit only with the blade-bearing portion. Alternatively, the radius of the shelf may be chosen such that the guard establishes an interference fit only with the non-blade-bearing portion. Alternatively, radius of the shelf may be chosen such that guard establishes an interference fit with both the non-blade-bearing portion and the blade-bearing portion.

In some embodiments the guard comprises two discs spaced apart along the length of the guard to form a space between the discs, wherein the space aligns with the blade when engaged with the annular support body.

The invention will now be described by way of example only, with reference to the accompanying drawings, in which.

DETAILED DESCRIPTION

Figure 1:
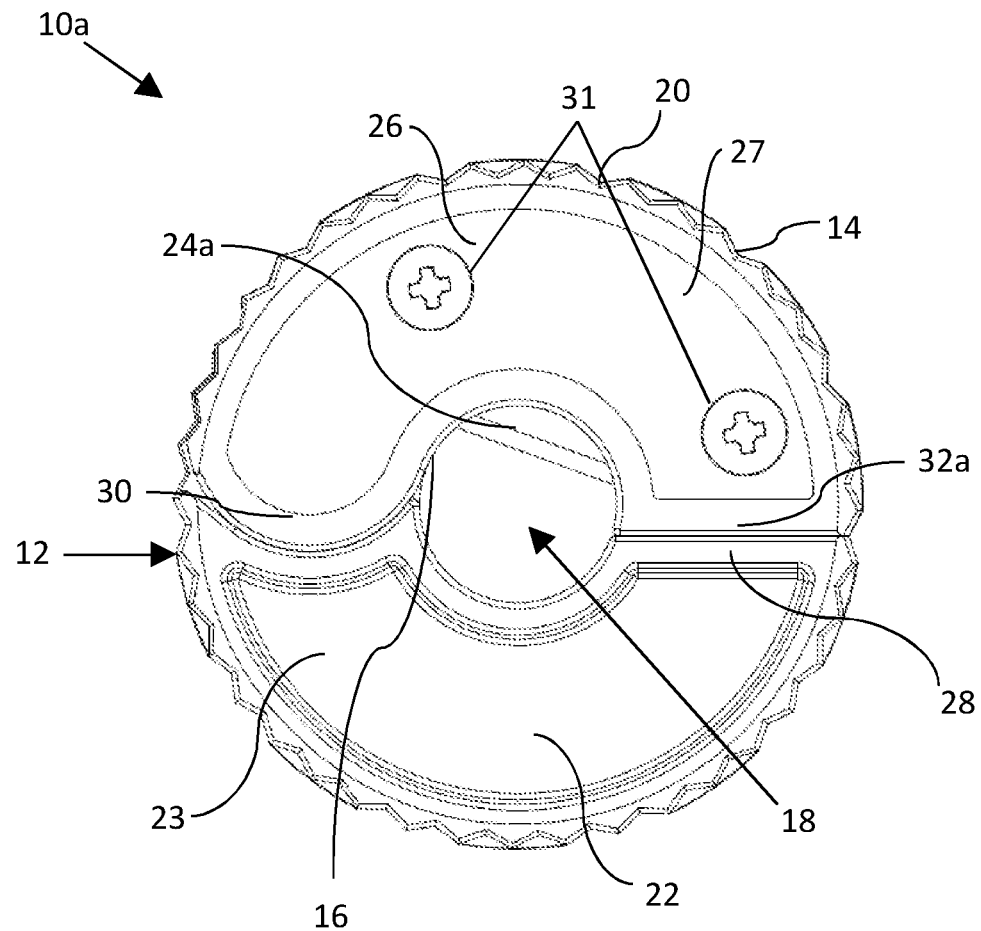
FIG. 1 shows a front plan view of a cutting device in the closed position according to an embodiment of the present invention.

FIG. 1 shows a front plan view of a cutting device according to an embodiment of the present invention in the closed position.

The cutting device 10a comprises an annular support body 12 for engaging a pipe to be cut.

The annular support body 12 has a generally cylindrical outer surface 14 and a cylindrical inner surface 16. The circumference of the cylindrical inner surface 16 defines an axial space 18 for receiving the pipe to be cut. In the present embodiment, the cylindrical outer surface 14 is ridged. Each ridge 20 extends along the width of the annular support body in a direction aligned with the longitudinal axis of the annular support body 12. This makes the cutting device 10a easy to grasp by a user. It will be appreciated that other patterns, or ridges only covering a portion of the cylindrical outer surface 14, are within the scope of the present invention.

The annular support body 12 comprises a non-blade-bearing portion 22 and a blade-bearing portion 26. The non-blade bearing portion 22 is secured to the blade-bearing portion 26 by way of a hinge mechanism 30 (not fully visible in FIG. 1, but see, for example, FIGS. 5 and 8 described further below). A part of each of the blade-bearing portion 26 and the non-blade bearing portion 22 comprise the hinge mechanism 30. The hinge mechanism 30 allows the two portions 22 and 26 to be movable between an open position in which the pipe can be inserted and removed from the space 18 and a closed position (shown), in which the pipe, once inserted (not shown), is engaged by the annular support body 12 in the space 18 and is axially aligned with the annular support body 12.

The cutting device 10a comprises a blade 24a fixed to the blade-bearing portion 26 of the annular support body 12 opposing the non-blade-bearing portion 22 (when in the closed position). The blade 24a is fixed to the blade-bearing portion 26 at a location other than the part comprising hinge mechanism 30.

It will be appreciated that in the context of the present invention, movement of the portions may be relative to one another around the hinge mechanism 30. In the present embodiment, the blade-bearing portion 26 and the non-blade bearing portion 22 are substantially semi-annular. It will be appreciated, however, that the non-blade-bearing portion 22 may have a smaller length than the blade-bearing portion 26. This allows the non-blade-bearing portion 22 to function as a gate in use.

In the present embodiment the blade 24a is formed of steel and comprises a linear cutting edge. It will, however, be appreciated that in other embodiments the blade may comprise a curved or other appropriately shaped edge, and may be formed of any suitable material, provided that it is capable of cutting a pipe of a set diameter in use. In the present embodiment, the blade 24a is oriented so that its linear cutting edge forms a complete geometric chord across the axial space enclosed by the cylindrical inner surface, such that both ends of the blade 24a are encased in the material of the blade-bearing portion 26. Equivalently, the blade 24a forms a complete geometric segment across the axial space 18 enclosed by the cylindrical inner surface 16. It will be appreciated that in other embodiments the blade may be provided at a different angle.

As shown in the Figure, the cutting device 10a is in the closed position without engaging a pipe. In this position (when no pipe is engaged), an end 28 of the non-blade-bearing portion 22 distal to the hinge mechanism 30 abuts an end 32a of the blade-bearing portion of the annular support body 26. This results in a continuous annular form. In the present embodiment both the edge of the distal end 28 and the edge of the end 32a are linear. In other embodiments one edge may be linear and one edge may be curved. In some embodiments the edge of the distal end 28 may be curved while the edge of the distal end 32a may be linear. Alternatively, at least one of the edges may be curved in the section nearest to the cylindrical inner surface but linear in the section nearest to the cylindrical outer surface, as seen in the embodiment of FIGS. 3-10.

While the pipe of a set diameter is capable of fitting into the diameter of the space 18, it is not possible to fully insert the pipe into the space 18 due to the blade 24a which extends into the space 18. It is not therefore possible to insert a pipe of the set diameter fully into the space 18 when the cutting device 10a is in the closed position.

In the example shown, the non-blade-bearing portion 22 and the blade-bearing portion 26 are formed of the same material, in this example a rigid material, such as a thermoplastic. Other materials fall within the scope of the present invention. In other embodiments, the non-blade-bearing portion 22 is formed of a different material to the blade-bearing portion 26. It will, however, be appreciated that the material of the non-blade-bearing portion 22 and the blade-bearing portion 26 is/are rigid.

The total diameter (i.e. the diameter when in the closed position) of the annular support body 12 is greater than its width. In other embodiments the width may be greater than the total diameter.

Although not shown in the Figure, in this example the blade-bearing portion 26 of the annular support body 12 is formed of two mirror image pieces, each formed of the same material, coupled to one another. In this instance the two pieces are coupled to one another using two screws 31, but it will be appreciated that in other embodiments other forms of attachment such as adhesive could be used. The blade 24a is fixed between the two mirror image pieces.

Any suitable hinge mechanism can be used for the hinge mechanism 30 of the cutting device 10a. In the present example, the hinge is formed by a cylindrical shaft (not shown) which holds together the non-blade-bearing portion 22 and blade-bearing portion 26.

In FIG. 1, the non-blade-bearing portion 22 is shown with a recess 23. The recess is formed in the open face of the non-blade-bearing portion 22 between the cylindrical outer surface 14 and the cylindrical inner surface 16. The recess 23 has a depth aligned with the longitudinal axis of the annular support body 12 extending to a central wall. In this embodiment, the depth of the recess 23 is substantially half of the width of the annular support body 12. An opposing recess, which is substantially half of the width of the annular support body 12, is on the other side of the central wall of the non-blade bearing portion 22 (not shown). In other embodiments the non-blade bearing portion 22 comprises one or no recesses. The recess 23 may have a depth which is no more than 45, 40, 35, 30, 25, 20, 15, 10 or 5% of the width of the annular support body 12.

Also in FIG. 1, the blade-bearing portion 26 is shown with a shallow recess 27. The recess is formed in the open face of the blade-bearing portion 26 between the cylindrical outer surface 14 and the cylindrical inner surface 16. This recess 27 has a depth which is no more than 10%, optionally no more than 5% of the width of the annular support body 12. The depth is defined by the position of the internal wall (not shown) which may otherwise be referred to as a sidewall. The recess 27 has a depth aligned with the longitudinal axis of the annular support body 12. The blade-bearing portion 26 of the annular support body 23 may comprise two opposing recesses, each recess having a depth aligned with the longitudinal axis of the annular support body 12, with each recess typically having a depth of no more than 10%, optionally no more than 5% of the width of the annular support body 12. The shallow recess 27 may instead be a recess having a depth which is substantially half the width of the annular support body 12. In other embodiments, the blade-bearing portion 26 may have no recesses.

The depth of recesses 23 and 27 are seen most clearly in the perspective views provided by FIGS. 5 and 7-10.

By "sidewall", this will be understood to be a wall forming a plane which is orthogonal to the cylindrical outer and inner surfaces; i.e. it links the two cylindrical surfaces. The sidewall may be substantially planar when viewed face-on.

In the present embodiment, the non-blade-bearing portion 22 of the annular support body 12 is unitary—i.e. it is formed of one section of material. This is advantageous since it means that simple manufacturing techniques such as 3D printing can be utilised.

In some embodiments, a "C" shape may be embossed into the part of the sidewall of the blade-bearing portion 26 comprising the hinge mechanism 30. The "C" embossment may also be provided on the opposing sidewall of the blade-bearing portion 26. Any suitable shape, letter or number can be embossed into this section. This embossed shape identifies the location of the hinge mechanism 30, allowing the user to quickly and easily determine how to open and close the portions 22 and 26. Further embossed shapes can be provided, for example, on another part of a sidewall of the blade-bearing 26 or non-blade-bearing 22 portions. For example, embossed arrows may be provided on a sidewall of either portion to further help guide the user in moving the portions in use or to guide the user in the direction of rotation of the device 10a when cutting a pipe.

Figure 2:
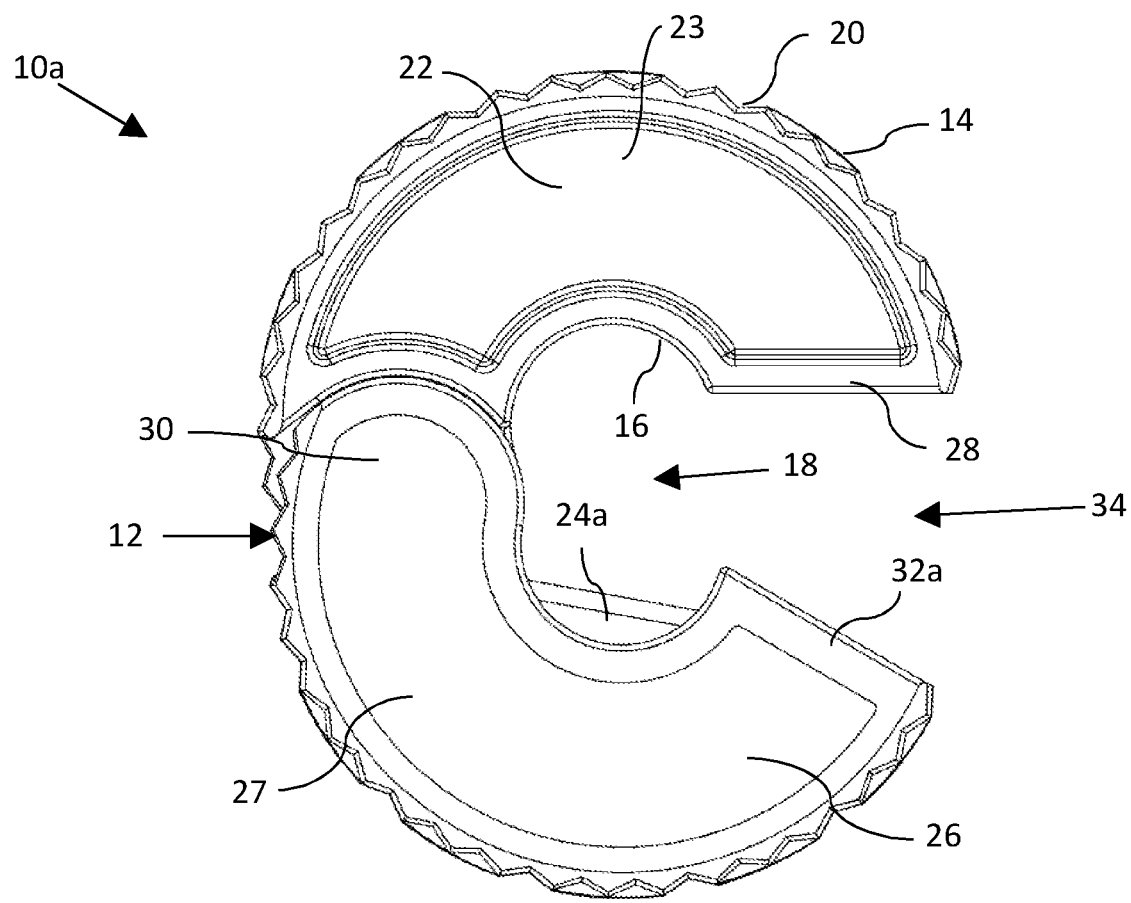
FIG. 2 shows a rear plan view of the cutting device of FIG. 1 in the open position

FIG. 2 shows the cutting device 10a of FIG. 1 but with the portions 22 and 26 in the open position. In this position, the distal end 28 of the non-blade-bearing portion 22 has been moved away from the distal end 32a of the blade-bearing portion 26 to provide an access slot 34. This allows the pipe to be cut to be inserted and removed from the space 18.

Figure 3:
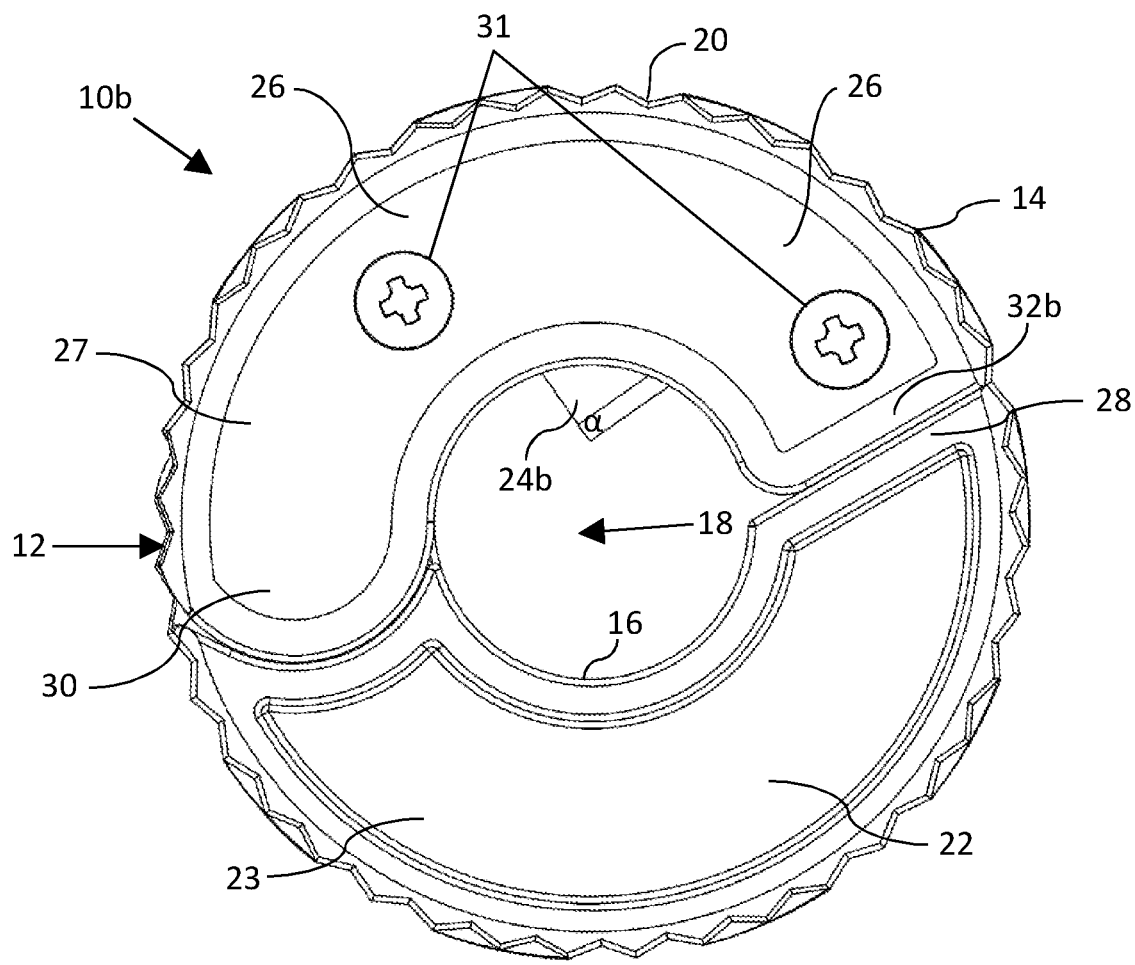
FIG. 3 shows a front plan view of a cutting device in the closed position according to another embodiment of the present invention.

FIG. 3 shows a cutting device 10b according to another embodiment of the invention. The Figure shows a front plan view of the cutting device 10b in the closed position. The embodiment of FIG. 3 is essentially the same as the embodiment of FIGS. 1 and 2 except for the configuration of the blade 24b. Where appropriate, the same reference numerals have been used for equivalent features.

In the present embodiment, the blade 24b is oriented so that its linear cutting edge forms only part of a geometric chord across the space 18 enclosed by the cylindrical inner surface 16. That is to say, that one end of the blade 24b is encased in the material of the blade-bearing portion 26. Equivalently, the blade 24b forms a partial geometric segment across the space 18 enclosed by the cylindrical inner surface 16.

FIG. 3 shows the blade at a particular angle of insertion relative to the blade-bearing portion 26, however, it will be appreciated that other angles may be chosen such that the blade forms different fractions of a segment. Several further examples of blade positioning can be seen in FIGS. 3a-3c.

Figure 3A:
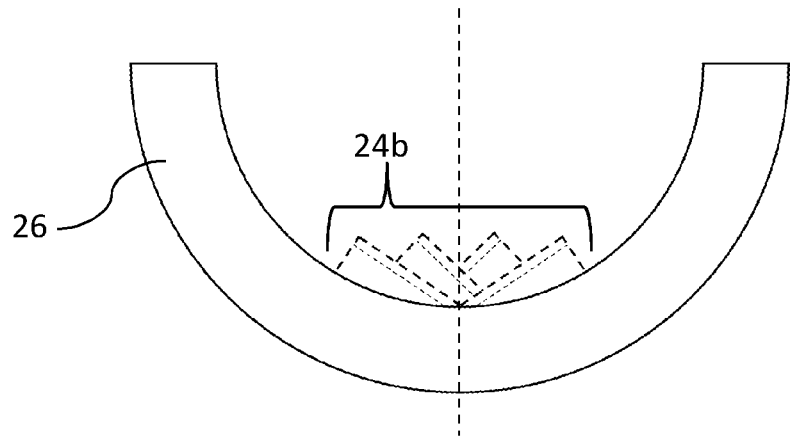
FIGS. 3a-3c show a front plan schematic view of the cutting device of FIG. 3, illustrating example positioning of the blade.

FIG. 3a shows four example locations of the blade 24b, which is positioned such that the blade corner is offset from the bisecting diameter of the blade-bearing portion 26. For the avoidance of doubt, the dotted outlines of blade 24b illustrate separate locations for the blade and are not intended to indicate a blade-bearing portion comprising four blades.

Figure 3B:
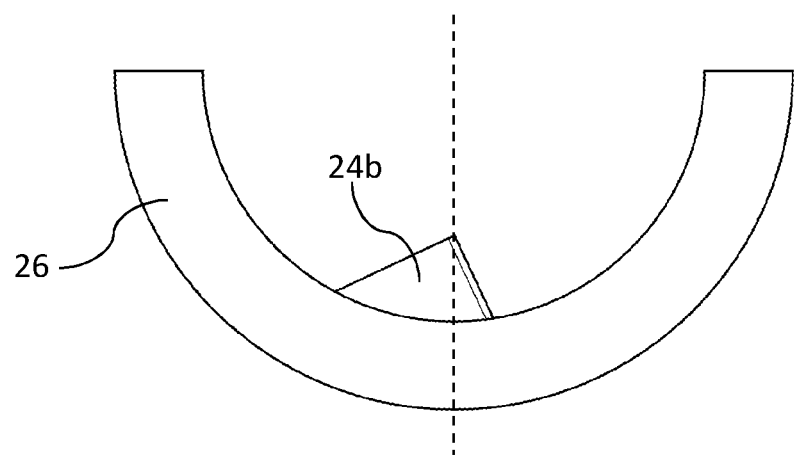

FIG. 3b shows an example location of the blade 24b, which is positioned such that the blade corner is aligned with the bisecting diameter of the blade-bearing portion 26.

Figure 3C:
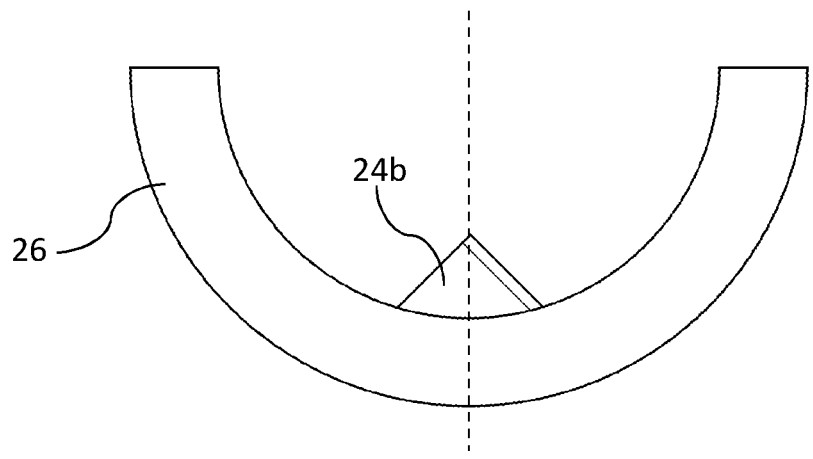

FIG. 3c shows an example location of the blade 24b, which is positioned such that the blade corner is aligned with the bisecting diameter of the blade-bearing portion 26 and the bisecting diameter further bisects the inner angle of the blade 24b.

A consequence of this configuration is that the blade 24b forms a triangular protrusion comprising an exposed point. In this embodiment, the inner angle α of the exposed point is 90°. The exposed point makes it easier for the blade 24b to pierce a pipe, thereby initiating cutting.

It is appreciated that a linear cutting edge forming a complete geometric chord may not easily pierce the pipe, meaning that additional force must be exerted on the device in order to cut the pipe. This may lead to the pipe being squeezed and distorted, resulting in a rough or uneven cut edge of the pipe. Therefore, a further consequence of the above configuration is that the exposed point ensures that the pipe is pierced cleanly such that the cut edge of the pipe is not rough or uneven. This makes the cut pipe more suitable for use with fittings that employ a push-fit application seal/joint.

Figure 4:
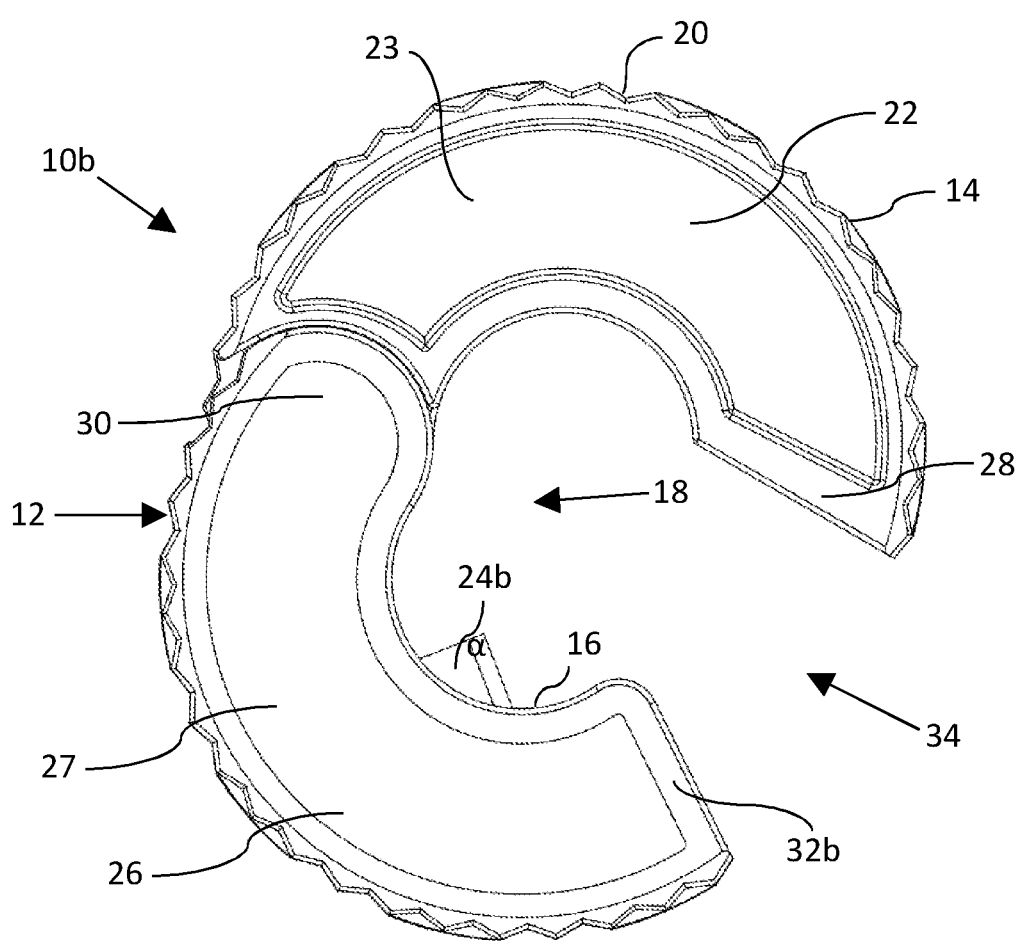
FIG. 4 shows a rear plan view of the cutting device of FIG. 3 in the open position.

FIG. 4 shows the cutting device 10b of FIG. 3 but with the portions 22 and 26 in the open position. In this position, the pipe to be cut may be inserted and removed from the space 18, as described above with reference to FIG. 2.

Figure 5:
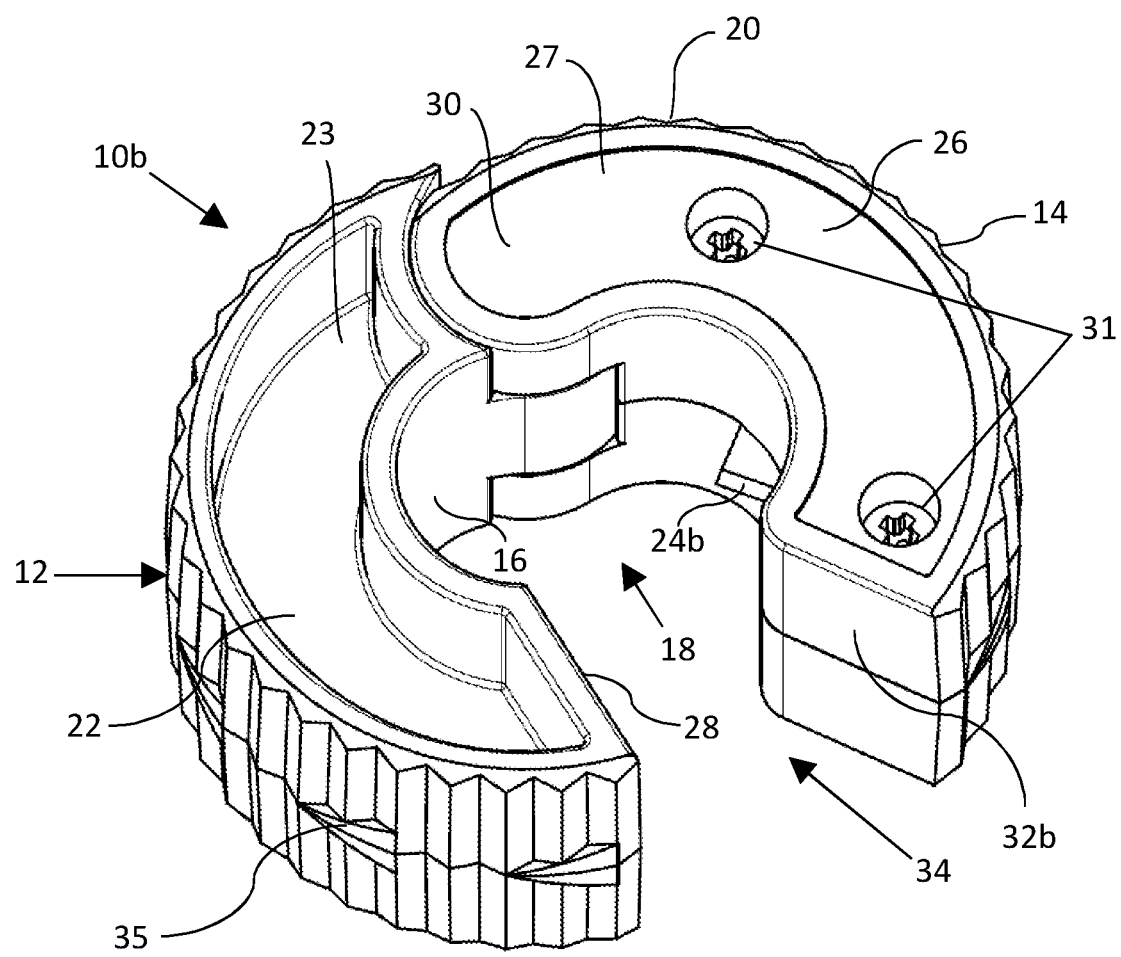
FIG. 5 shows a front perspective view of the cutting device of FIG. 3 in the open position.

FIG. 5 shows a front perspective view of the cutting device 10b of FIGS. 3 and 4 with the portions 22 and 26 in the open position, as in FIG. 4. From this view, directional arrows 35 can be seen marked on the cylindrical outer surface 14. The arrows 35 provide an indication to the user of what direction the cutting device 10b should be rotated around the longitudinal axis of the annular support body 12, once the pipe to be cut has been inserted. The arrows 35 are of particular importance for embodiments which have a blade 24b configured to form only part of a segment. This is because not all edges of the blade 24b are necessarily sharp. This implies that rotation of the device in the wrong direction (i.e. the direction opposing the directional arrows 35) would lead to the pipe being urged against the blunt edge of the blade 24b and not being cut as effectively.

In FIG. 5, the arrows 35 are raised markings that have been formed as part of the moulding of the device 10b. It will be appreciated that other means of providing the arrows 35 are possible, for example, by engraving, embossing, painting, or other means.

Figure 6:
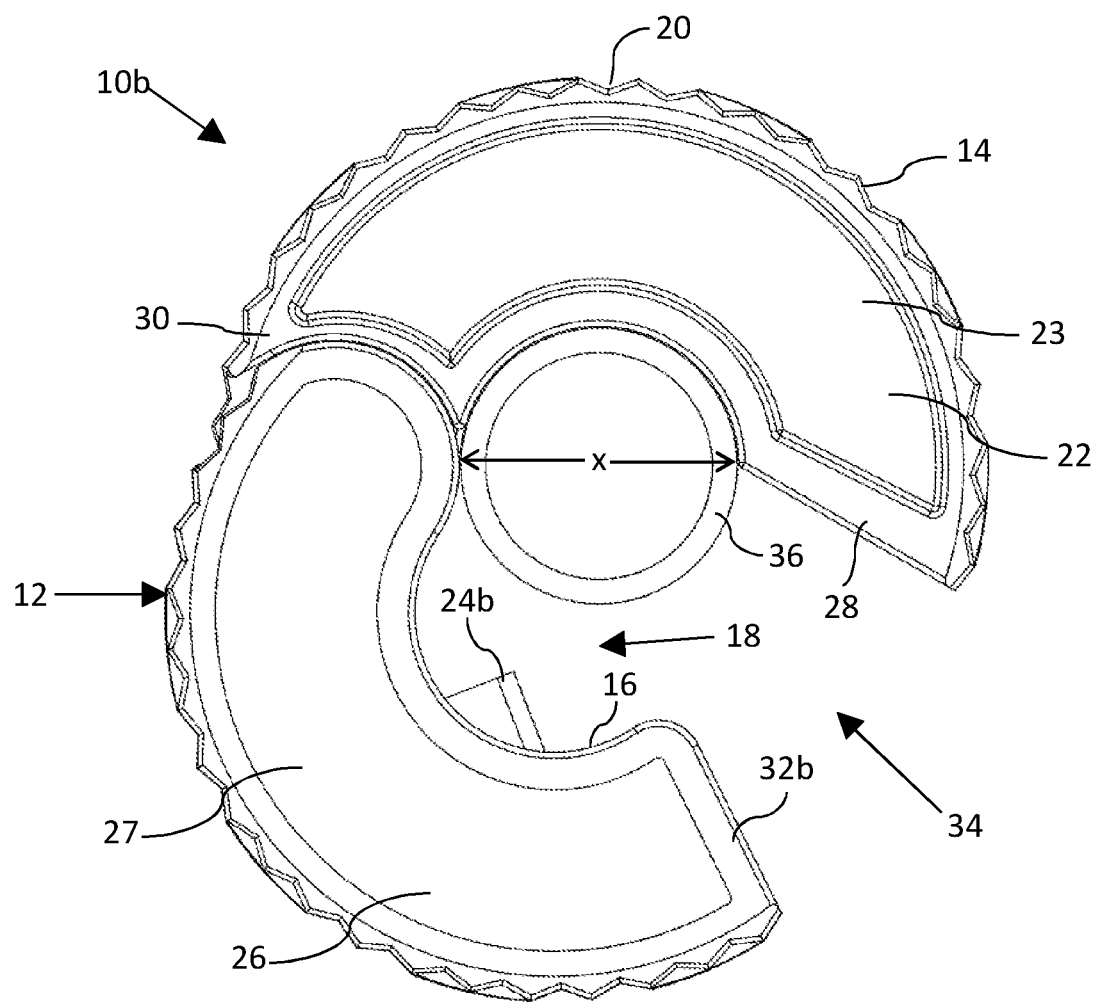
FIG. 6 shows a rear plan view of the cutting device of FIG. 3 being engaged with a pipe as the portions are closing.

FIG. 6 shows a cutting device 10b identical to the cutting device of FIGS. 3-5. The Figure shows a plan view of this cutting device 10b being engaged with a pipe 36 as the portions 22 and 26 are closing. The diameter x of the pipe 36 is such that it is capable of fitting into the space 18.

In use, the pipe 36 is inserted into the space 18 of the annular support body 12 via the access slot 34 when the blade-bearing portion 26 and the non-blade-bearing portion 22 are in the open position. Once the pipe 36 is inserted, the portions 22 and 26 are moved into the closed position. This means that the portions 22 and 26 are moved about the hinge mechanism 30 such that the distal end 28 of the non-blade-bearing portion 22 moves closer to the distal end 32b of the blade-bearing portion 26. Due to the blade 24b extending into the space 18, it is not possible to fully close the portions 22 and 26 when a pipe 36 is inserted. However, this mechanism ensures that the closing of the portions 22 and 26 urges the pipe against the cutting edge of the blade 24b and secures the pipe 36 in the annular support body 12 so that it cannot fall out. The user can then rotate the cutting device 10b around the longitudinal axis of the annular support body 12, which cuts the pipe 36.

It will be understood that in embodiments where the blade forms a complete geometric chord (for example, blade 24a) the mechanism of closure ensures that the closing of the portions urges the pipe against the linear cutting edge of the blade 24a. Whereas, in embodiments where the blade forms a partial geometric chord (for example, blade 24b) the mechanism of closure ensures that the closing of the portions urges the pipe against the exposed point of the blade 24b, piercing the pipe once enough force is exerted on portions 22 and 26.

Figure 7:
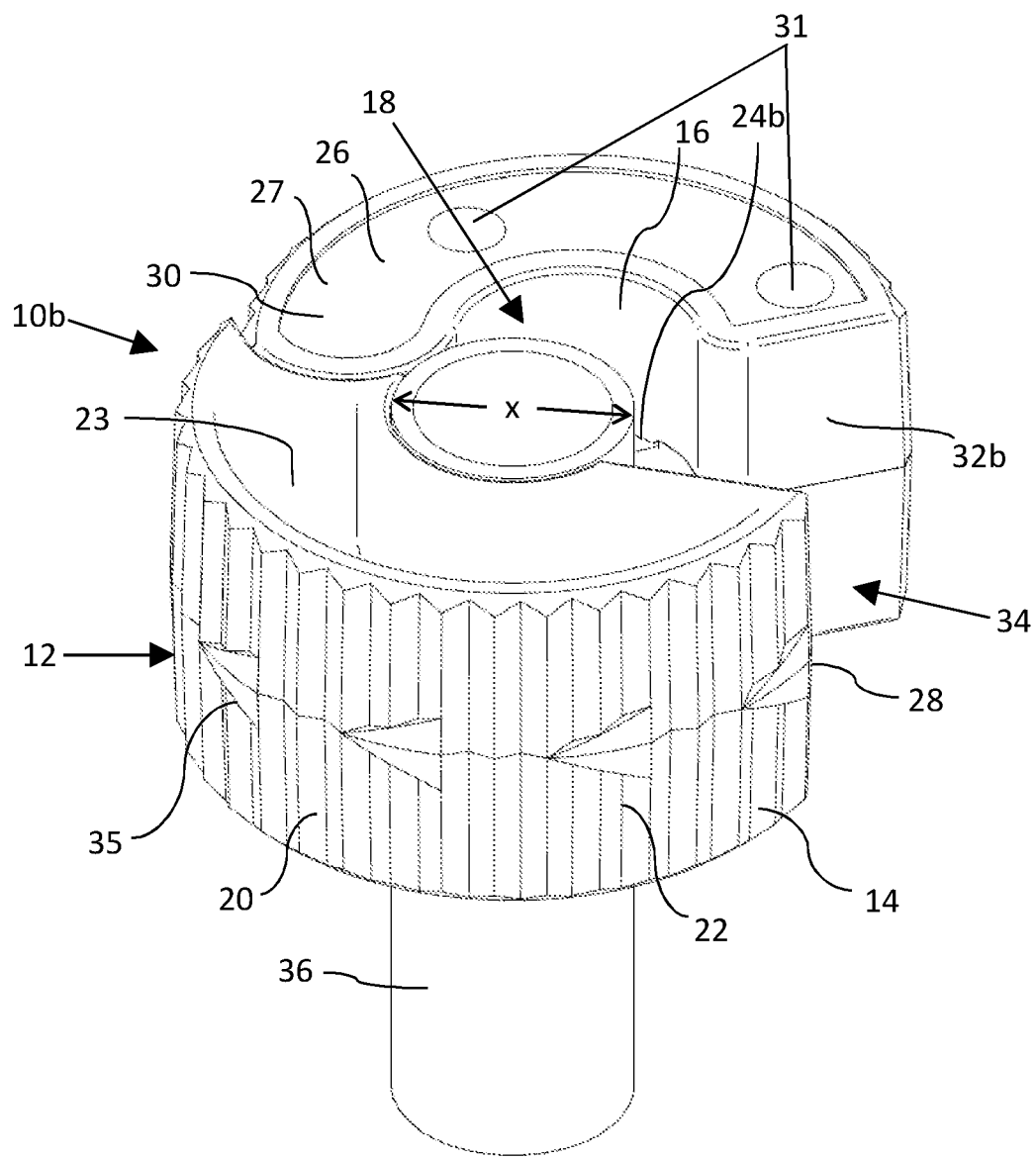
FIG. 7 shows a front perspective view of the cutting device of FIG. 3 being engaged with a pipe as the portions are closing.

FIG. 7 shows a front perspective view of the cutting device 10b of FIGS. 3-6 being engaged with a pipe 36, as in FIG. 6. It is clear from this Figure that the directional arrows 35 point in the appropriate direction such that the blade 24b will cut through the pipe 36 as the device 10b is rotated around the longitudinal axis of the annular support body 12. Also shown are the two screws 31 which are used to couple together the two pieces of the blade bearing portion 26.

Figure 8:
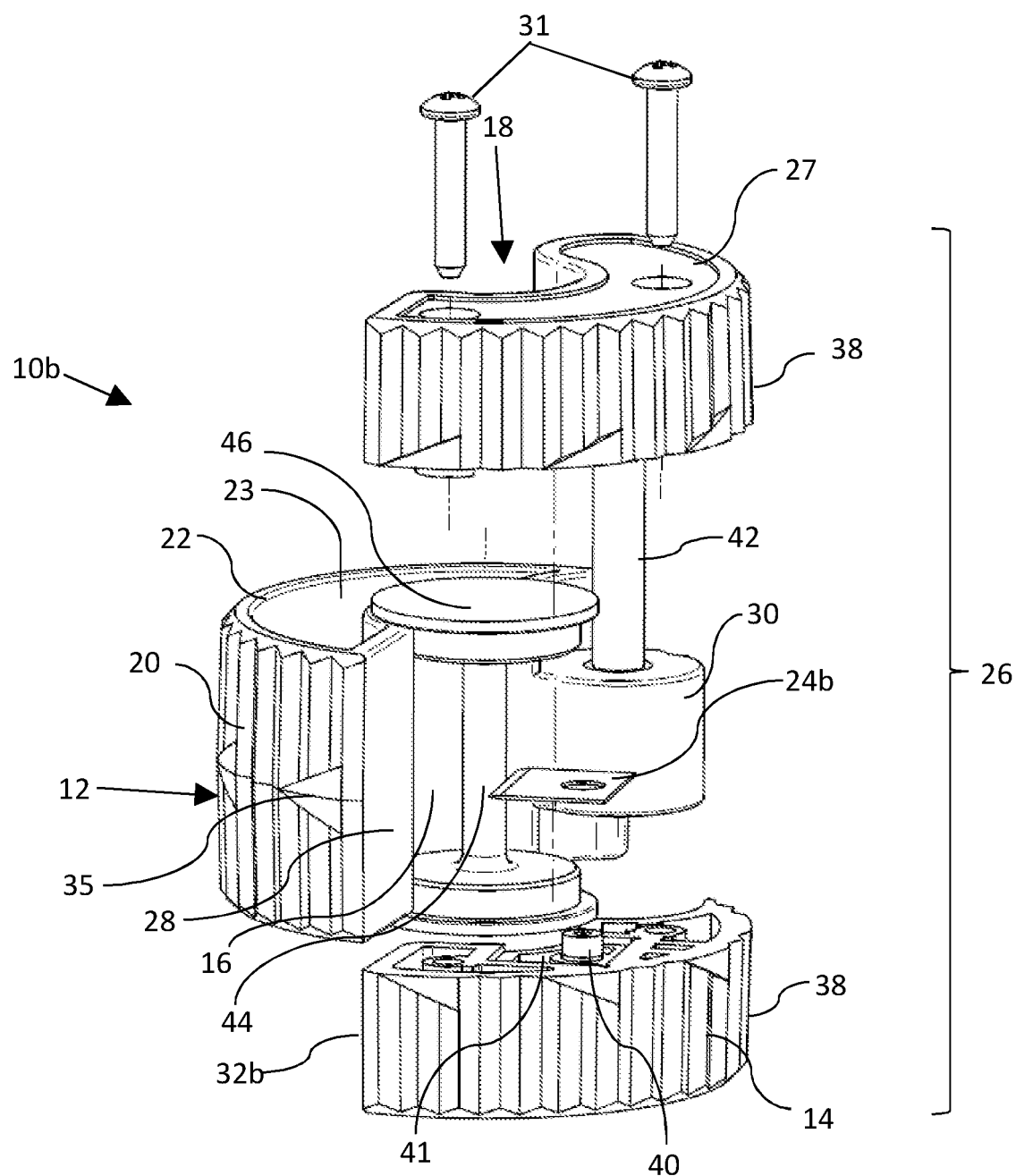
FIG. 8 shows an exploded view of the cutting device of FIG. 3.

FIG. 8 shows an exploded view of a cutting device 10b according to an embodiment of the present invention. The cutting device is identical to the device of FIGS. 3-7. Shown in this Figure are the two mirror image pieces 38, each formed of the same material, which when coupled together form the blade-bearing portion 26.

Also shown are the two screws 31 and the blade 24b. Once assembled, the two screws pass through the two mirror pieces 38 to couple the two mirror pieces together to form the blade-bearing portion 26. It will be appreciated that one, two, three, or more screws may be used to secure the pieces 38.

One of the mirror pieces 38 comprises a cylindrical projection 40, for example a spigot. The spigot may be integral to the mirror piece 38. The mirror pieces 38 may further comprise at least one receiving pocket 41 in which the blade 24b can be seated during assembly. The blade 24b comprises an aperture through which the spigot passes to secure the blade 24b. The spigot and pocket 41 also ensure that the blade 24b is centralised and angled correctly with respect to the mirror piece 38. A pad (not shown) may also be provided on either piece 38 to further secure the blade 24b in position once assembled. For example, once assembled, the blade 24b may be positioned between the receiving pocket 41 and the pad, such that the blade 24b is clamped in position.

A cylindrical shaft 42 provides the hinge mechanism 30 between the non-blade-bearing portion 22 and the blade-bearing portion 26. In the present embodiment, the shaft 42 and screws 31 are metal, but the skilled person will appreciate that other materials and forms of attachment/hinge mechanisms will be suitable.

Also shown in the Figure is an optional removable guard 44.

The removable guard 44 can be inserted and removed from the annular support body 12 in the same way as the pipe to be cut. In this way, the removable guard 44 can engage with the cylindrical inner surface 16 and the blade 24b (or 24a, in alternative embodiments) of the annular support body 12 when in the closed position to cover and guard the blade 24b.

The guard 44 may be any suitable shape provided that it is secure in the annular support body 12 and covers the blade 24b. Typically, the guard has a cylindrical or hourglass shape. In the embodiment shown the removable guard 44 has a cylindrical body, which engages with the blade 24b when enclosed by the annular support body 12. In the embodiment shown, each end of the guard 44 comprises a cap 46 having a diameter greater than the diameter of the space 18. This ensures that once the guard 44 is in position in the annular support body 12, and the portions 22 and 26 are in the closed position, the guard 44 cannot be removed unless the portions 22 and 26 are moved to the open position.

In other embodiments, the guard 44 may comprise an hourglass shape, the hourglass shape having a wall bridging the diameter of the narrowest section of the removable guard. A groove may circle the wall such that the blade 24b can be inserted into the groove in the closed position. Each end of the hourglass shape may be open to form a recess, the end of which is defined by the wall. This provides an hourglass shape having two openings which is easy to handle.

The guard may comprise or consist of any suitable material. In the example shown, the guard is formed of a resilient plastic. This allows the guard 44 to fit snugly into the space 18. In other embodiments the guard is formed of a rigid material such as a rigid plastic.

Figure 9:
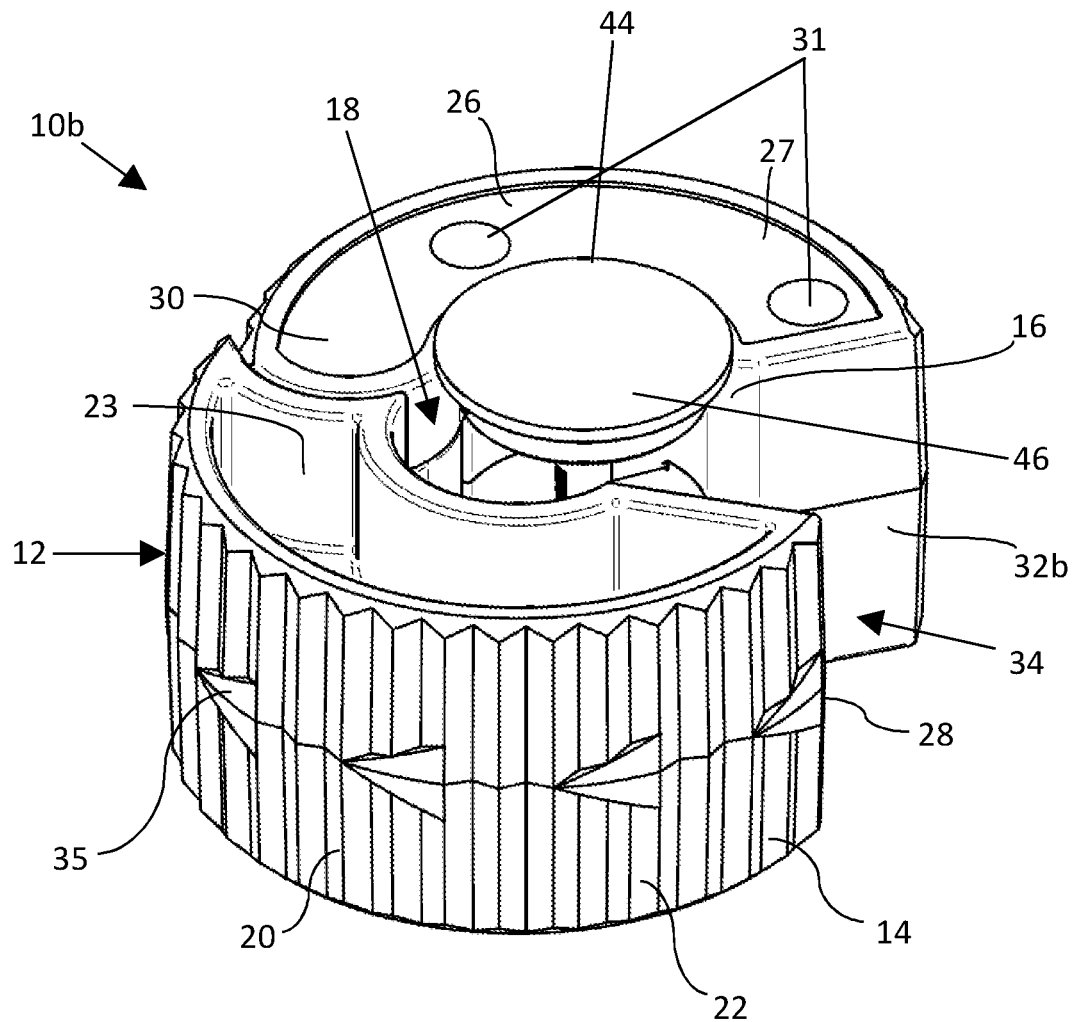
FIG. 9 shows a front perspective view of the cutting device of FIG. 3 engaged with a removable guard as the portions are closing.

FIG. 9 shows a front perspective view of a cutting device 10b identical to the cutting device of FIGS. 3-8 being engaged with a removable guard 44 as the portions 22 and 26 are closed.

Figure 10:
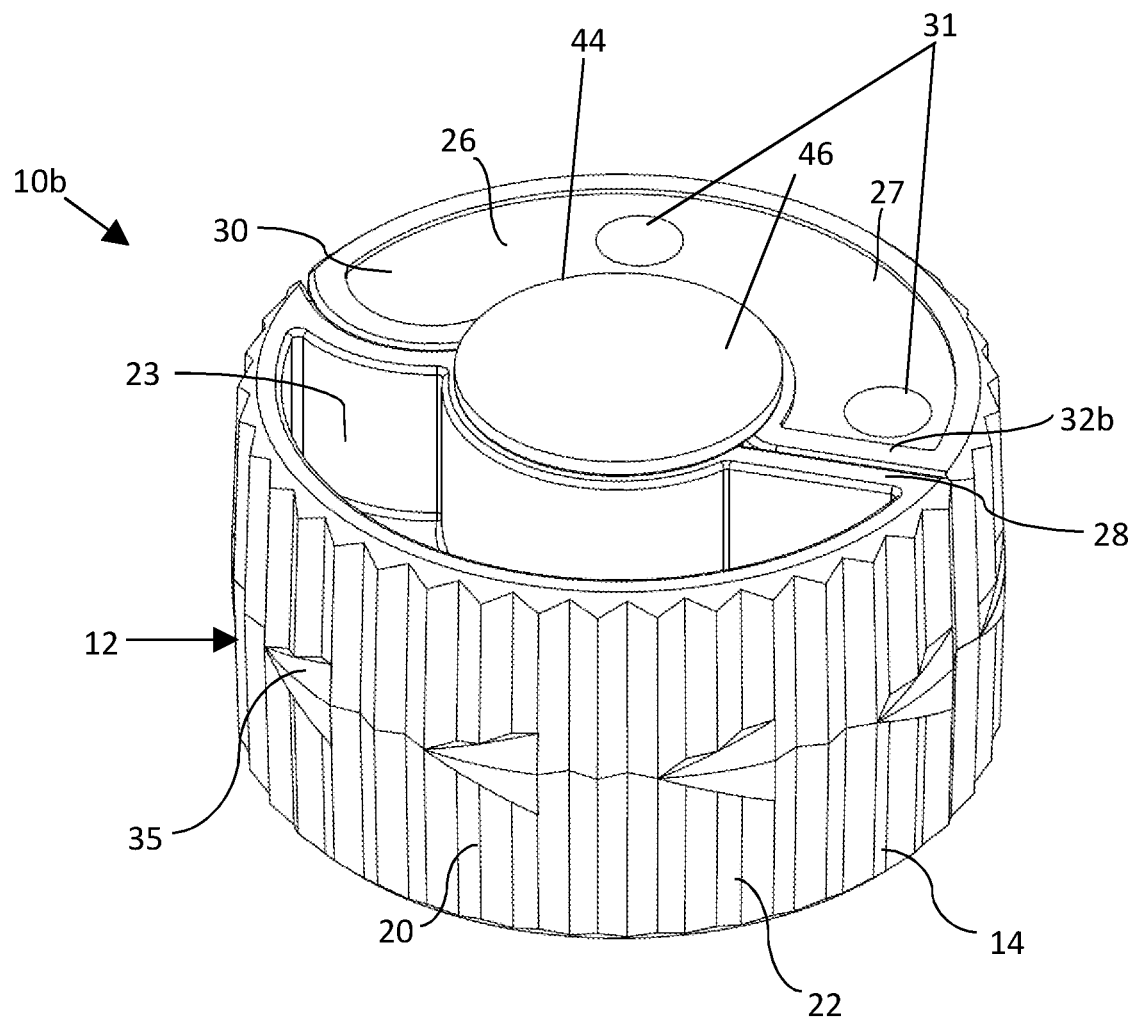
FIG. 10 shows a front perspective view of the cutting device of FIG. 3 in the closed position with a removable guard in place.

FIG. 10 shows a front perspective view of a cutting device 10b identical to the cutting device of FIGS. 3-9 engaged with a removable guard 44 and with the portions 22 and 26 in the closed position.

Figure 11:
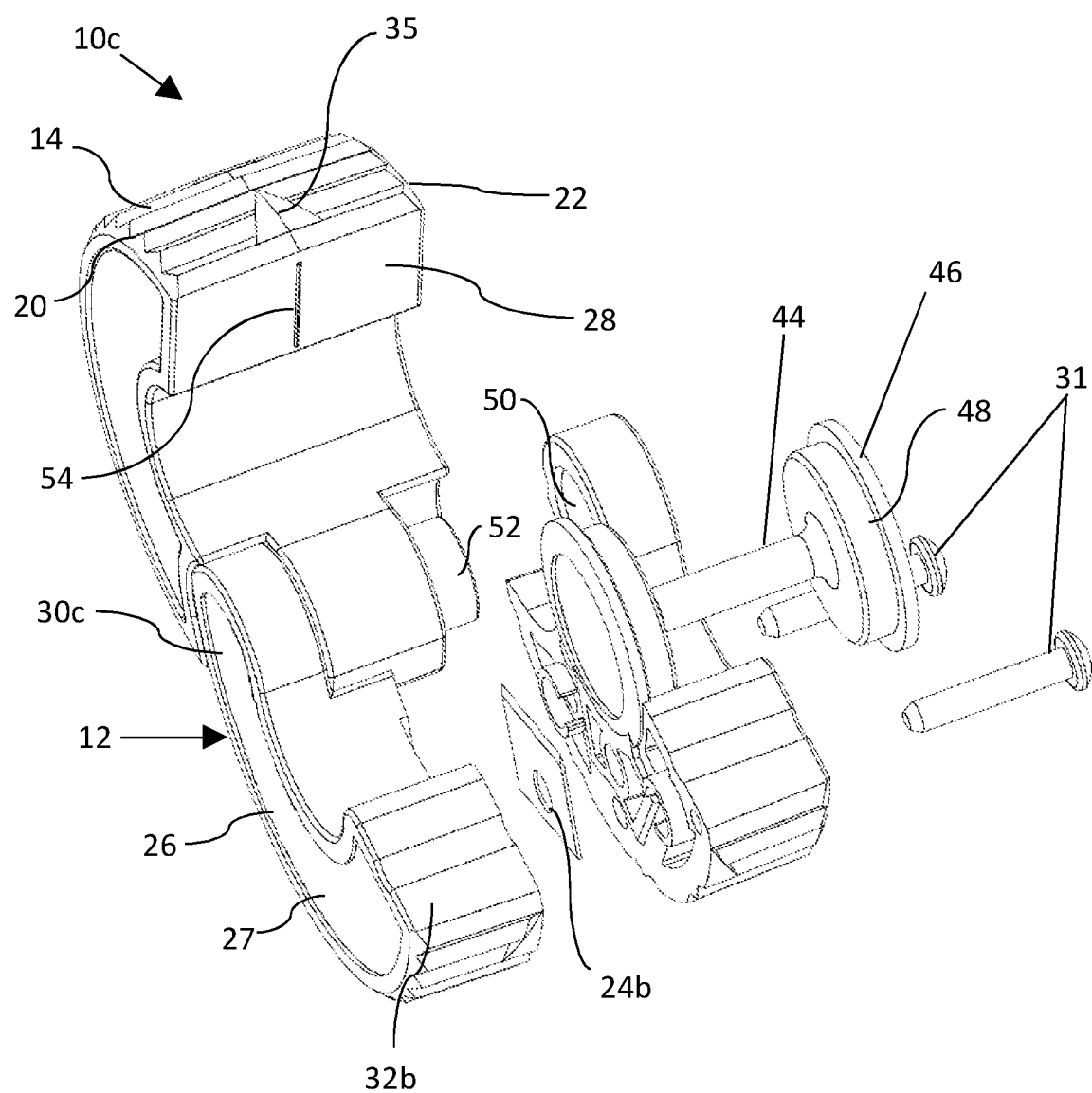
FIG. 11 shows an exploded perspective view of a cutting device in the open position according to another embodiment of the present invention.

Turning to FIG. 11, a cutting device 10c according to another embodiment of the invention is shown. The Figure shows an exploded perspective view of the cutting device 10c in the open position. The embodiment is similar to previous embodiments and like numerals have been used for like features, without need for repeated description. The embodiment of FIG. 11 differs only in minor details which will be described here.

Hinge mechanism 30c differs from hinge mechanism 30 of the previous embodiments. In cutting device 10c, the hinge mechanism 30c comprises pegs 52 and hinge recesses 50. There are two pegs 52, though only one is visible in FIG. 11. The visible peg 52 is located on non-blade-bearing portion 22. The other peg 52 is similarly located on the non-blade-bearing portion 22, on the opposing side. The pegs 52 are received by hinge recesses 50, which are located on blade-bearing portion 26. In the present embodiment, the pegs 52 protrude parallel to the longitudinal axis of the cutting device 10c, and away from the location of blade 24b.

It will be understood by the skilled person that it is similarly possible for the pegs 52 to be located on the blade-bearing portion 26, and the hinge recesses 50 to be located on the non-blade-bearing portion 22. In such an embodiment, the pegs would protrude parallel to the longitudinal axis of the cutting device 10c, and towards the location of blade 24b.

Cutting device 10c further comprises a blade alignment indicator 54. In the present embodiment, blade alignment indicator 54 consists of an embossed line on distal end 28 of the non-blade-bearing portion 22. The blade alignment indicator 54 is at a depth within the annular support body 26 that is the same as the depth of the blade 24b. That is to say that the blade 24b and the blade alignment indicator 54 are in the same position relative to the longitudinal axis. The blade alignment indicator 54 is parallel to the linear cutting edge of the blade 24b.

This means that if the user of the cutting device 10c cannot see blade 24b, they are still able to align the cutting device 10c such that the blade 24b cuts the tube in the desired location and at the desired angle. In particular, if during use a tube is placed in blade-bearing portion 26, the user will not be able to see the positioning of the blade 24b. However, as the cutting device 10c is urged into the closed position, the user is able to see the position of blade alignment indicator 54, which indicates where the final cut will take place.

Lastly, the configuration of guard 44 will be described in more detail. The caps 46 of guard 44 comprise a shelf 48. The shelf 48 has a smaller radius to the radius of cap 46. In this embodiment, the shelf 48 also has a thickness greater than the thickness of cap 46.

The shelf 48 enables the guard 44 to establish an interference fit with the cutting device 10c. In the present embodiment, the shelf 48 has a radius that is the same or greater than the radius of the cylindrical inner surface of the blade-bearing portion 26. This means that the shelf 48 will engage in an interference fit with blade-bearing portion 26. This means that additional force will be required from the user to remove guard 44 when the cutting device 10c is in the open position. In turn, this means that the guard 44 is less likely to inadvertently fall out of the cutting device 10c. It is understood that in alternative embodiments, the shelf 48 may establish an interference fit with the non-blade-bearing portion 22 as well as or instead of with the blade-bearing portion 26. It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A cutting device for cutting a pipe of a set diameter, the cutting device comprising an annular support body defining an axial space into which a pipe to be cut can be inserted, the annular support body formed of a rigid material and comprising:

a blade-bearing portion; and a non-blade-bearing portion, wherein the blade-bearing portion is secured to the non-blade-bearing portion by a hinge mechanism allowing the two portions to be movable between an open position, in which the pipe can be inserted and removed from the body, and a closed position, in which the pipe, once inserted, is engaged by and axially aligned with the annular support body, wherein a part of the blade-bearing portion spaced from the hinge mechanism comprises a blade that protrudes radially inwards of the annular body, such that in use the urging of the two portions towards the closed position urges the pipe against the blade so that rotation of the cutting device around the pipe cuts the pipe, and wherein the cutting device further comprises a removable guard substantially recessed inside the annular support body for engagement with the annular support body and alignment with a longitudinal axis of the annular support body when the cutting device is not in use.

2. A cutting device according to claim 1, wherein the blade comprises a linear cutting edge.

3. A cutting device according to claim 2, wherein one or both ends of the linear cutting edge are encased in the rigid material of the blade-bearing portion of the annular support body.

4. A cutting device according to claim 2, wherein one end of the linear cutting edge is encased in the rigid material of the blade-bearing portion of the annular support body such that the blade forms a triangular protrusion with an exposed point.

5. A cutting device according to claim 1, wherein the blade-bearing portion comprises two pieces coupled to one another.

6. A cutting device according to claim 5, wherein the blade is fixed by being clamped between the two pieces.

7. A cutting device according to claim 1, wherein at least one of the blade-bearing portion and the non-blade-bearing portion of the annular support body comprises a recess having a depth aligned with the longitudinal axis of the annular support body.

8. A cutting device according to claim 1, wherein the non-blade-bearing portion of the annular support body is unitary.

9. A cutting device according to claim 8, wherein the annular support body comprises a glass filled plastic.

10. A cutting device according to claim 1, wherein the annular support body comprises a plastics material.

11. A cutting device according to claim 1, wherein a cylindrical outer surface of the annular support body is ridged.

12. A cutting device according to claim 11, wherein the removable guard comprises a cap at both ends.

13. A cutting device according to claim 1, wherein the hinge mechanism comprises a cylindrical shaft.

14. A cutting device according to claim 1, wherein the hinge mechanism comprises two or more pegs, wherein the pegs are configured to be received by two or more hinge recesses.

15. A cutting device according to claim 1, wherein the blade bearing portion of the annular support body comprises a part-cylindrical inner surface and the non-blade-bearing portion of the annular support body comprises a part-cylindrical inner surface, and wherein a radius of the part-cylindrical inner surface of at least one of the blade-bearing portion and the non-blade-bearing portion is less than or equal to a radius of the pipe to be cut so as to provide an interference fit that grips the pipe to be cut.

16. A cutting device according to claim 1, wherein the non-blade-bearing portion comprises a blade alignment indicator.

17. A cutting device for cutting a pipe of a set diameter, the cutting device comprising an annular support body defining an axial space into which a pipe to be cut can be inserted, the annular support body formed of a rigid material and comprising a blade-bearing portion and a non-blade-bearing portion, the blade-bearing portion being secured to the non-blade-bearing portion by a hinge mechanism allowing the two portions to be moveable between an open position and a closed position, wherein at least one of the blade-bearing portion and the non-blade-bearing portion comprises a part-cylindrical inner surface, the part-cylindrical inner surface having a radius less than or equal to a radius of the pipe to be cut so as to provide an interference fir that grips the pipe to be cut, and wherein the cutting device further comprises a removable guard substantially recessed inside the annular support body for engagement with the annular support body and alignment with a longitudinal axis of the annular support body when the cutting device is not in use.

18. The cutting device of claim 17 wherein the blade-bearing portion comprises a blade that protrudes radially inwards of the annular body, such that, in use, the urging of the two portions towards the closed position urges the pipe against the blade so that rotation of the cutting device around the pipe cuts the pipe.

19. A cutting device for cutting a pipe of a set diameter, the cutting device comprising an annular support body defining an axial space into which a pipe to be cut can be inserted, the annular support body formed of a rigid material and comprising:

a blade-bearing portion; and a non-blade-bearing portion, wherein the blade-bearing portion is secured to the non-blade-bearing portion by a hinge mechanism allowing the two portions to be moveable between an open position and a closed position, wherein the blade-bearing portion comprises a blade that protrudes radially inwards of the annular body, such that, in use, the urging of the two portions towards the closed position urges the pipe against the blade so that rotation of the cutting device around the pipe cuts the pipe, and a removable guard substantially recessed inside the annular support body for engagement with the annular support body and alignment with a longitudinal axis of the annular support body when the cutting device is not in use.

* * * * *